United States Patent Office 2,925,343
Patented Feb. 16, 1960

2,925,343

METHOD AND COMPOSITION FOR PREPARING COLD WATER DESSERTS

James K. Rocks, San Diego, Calif., assignor to Kelco Company, San Diego, Calif., a corporation of Delaware No Drawing. Application March 1, 1957
Serial No. 643,257

17 Claims. (Cl. 99—131)

This invention relates to cold water dessert gels and a method and composition particularly suitable for the preparation of such gels. More particularly, the invention relates to a cold water dessert gel composition comprising carboxymethyl alginate and other ingredients to be more particularly hereinafter described.

In the manufacture of dessert gels, various compositions have been utilized. It is toward the improvement in the manufacture of such gels that this invention is directed. It is desirable to provide a composition that can be readily dispersed in cold water with a minimum of effort. Many of the compositions that have been heretofore used must be dissolved in hot water and a rather substantial time is required to form a gel, in that the solution must first be allowed to cool and often under substantial refrigeration. There are other materials that have been suggested for use in manufacturing cold water dessert gels that are inordinately sensitive to the minerals naturally contained in tap water. Thus, such compositions will work well with water in one locality and yet will hardly form a gel with the tap water in another locality. Still further compositions are not particularly palatable, and large amounts of flavoring are required to mask what would otherwise be an objectionable taste.

It is an object of this invention, therefore, to provide a new and useful composition for the preparation of cold water dessert gels.

It is another object of this invention to provide a new and useful cold water dessert gel composition that is relatively unaffected by the varying mineral content of tap water or well water from one location to another.

Other and further objects of my invention will be apparent from the description hereinafter set forth.

In general, my method comprises adding a relatively high viscosity carboxymethyl alginate, a salt preferably a calcium salt such as dicalcium phosphate, and a weak acid, preferably fumaric acid, to an aqueous medium such as cold water to produce a gel composition. The materials and methods which I employ are more particularly set forth below.

The carboxymethyl alginate that I prefer to use in accordance with my invention is not only, as aforementioned, a relatively high viscosity carboxymethyl alginate, but also I prefer to use such an alginate containing a relatively low amount of calcium.

The carboxymethyl alginates that I employ in accordance with my invention, are a very recent algin development. Such alginates are preferably prepared from either sodium alginate or calcium alginate by reacting such an alginate with a concentrated sodium hydroxide solution to form the alcoholate. The alcoholate so formed is then reacted with a chloroacetic compound such as sodium chloroacetate to form a carboxymethyl alginate. The following examples set forth procedures for producing carboxymethyl alginates.

*Example 1*

600 gms. of dry calcium alginate were mixed with 480 gms. of a 50% sodium hydroxide solution in a Hobart mixer. The internal temperature was maintained at 20° C. The mixing was continued for 15 minutes and then 1755 gms. of 40% sodium chloroacetate were added to the mixture. The temperature was still maintained at 20° C. The resulting mixture was allowed to set for 24 hours. It was then dumped into 4 liters of 75-25 methanol-water mix. The mix was then stirred in a large Waring Blendor for several minutes. It was then filtered and the precipitate retreated two more times by the same procedure with the methanol-water mix. A similar treatment with three 100% methanol treatments followed. The mixture was then air-dried and milled through 40 mesh. The resulting product was identified as sodium calcium carboxymethyl alginate.

*Example 2*

A 600 gm. sample of a commercial sodium alginate sold under the name Kelcosol was substituted for the calcium alginate in the preceding example and a small amount (100 to 150 ml.) of isopropyl alcohol was added in order to prevent too heavy a paste from being formed. The procedure of Example 1 was then repeated with the aforesaid exceptions, and a sodium carboxymethyl alginate was formed.

The reaction of the algin with the sodium chloroacetate may be expressed as follows:

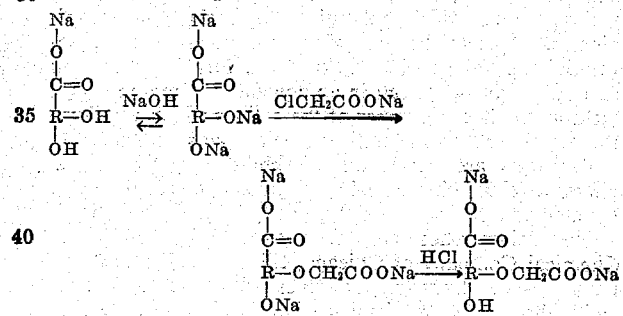

where R represents all portions of each algin polymer link to which are attached the $C_2$ and $C_3$ hydroxyls and the uronic carboxyls.

The chloroacetic compound, calculated as sodium chloroacetate, is used in an amount that is varied depending upon the degree of substitution desired, as well as the temperature and time of reaction. In general, about .4 to 1.5 parts by weight as sodium chloroacetate per part of algin calculated as sodium alginate, dry basis, will be found suitable.

The reaction time for the aforementioned materials will vary depending on the temperature at which the reaction is carried out. A temperature and reaction time is selected to obtain optimum reaction of the ingredients with a minimum degradation effect on the algin. Ordinarily, this is in the range of 0° C. to 60° C. and from 1 hour to 1 week. It has been noted that in the 50° to 60° range, good results may be obtained in from 2 to 4 hours.

In the foregoing I have given general procedures for preparing the new algin products, i.e., carboxymethyl alginates.

As aforementioned, I use a carboxymethyl alginate in accordance with my new cold water dessert gel development that has a high viscosity and preferably a relatively low calcium content. In the event the viscosity is extremely low no desirable gel will be formed. I prefer to employ a carboxymethyl alginate that has a viscosity of at least 1000 cps. in a 5% water solution. The following procedure produced a low calcium high viscosity sodium carboxymethyl alginate having a viscosity of 3800 cps. in a 5% water solution. This product proved to be particularly desirable for my purpose. In producing said product I took a 600 gm. sample of a high viscosity sodium alginate, sold under the name Kelcosol by the Kelco Company in San Diego, California, and mixed said alginate with a 480 gm. portion of a 50% sodium hydroxide solution. The mixing was carried out in a Hobart mixer. In order to prevent the resulting paste from becoming too heavy, 125 ml. of isopropyl alcohol was added to the mix. The reactants prior to being mixed had been precooled to a temperature of approximately 5° C., and this temperature was maintained throughout the reaction. The mixing was continued for a period of 15 minutes. Thereafter a 1755 gm. portion of 40% sodium chloroacetate was added to the mixture while still maintaining a low temperature. The resulting mixture was allowed to stand for a period of seven days at 0–5° C. It was then dumped into 4 liters of 75–25 methanol-water mix which had been precooled to 0–5° C. The mix was then stirred in a large Waring Blendor for several minutes. It was then filtered and the precipitate retreated two or more times by the same procedure with the methanol-water mix. Then, a similar treatment with 100% methanol was carried out three times. The mixture was then air dried and milled through 80 mesh. The resulting product was identified as sodium carboxymethyl alginate.

My composition, in addition to containing a carboxymethyl alginate, also contains a salt, preferably of calcium, which either is insoluble or very slightly soluble in water, or which in aqueous solution is only slightly ionized, or both, and which on the addition of an acid yields cations which gelatinize the carboxymethyl alginates. This might otherwise be defined as an algin-gelatinizing salt having a low solubility product. In still other words, the salt in an aqueous medium must not yield any material number of the cations which gelatinize the alginic component until the acid reacts with the salt.

Examples are tricalcium phosphate, dicalcium phosphate, calcium citrate, calcium gluconate, calcium carbonate, and the so-called "specially coated" anhydrous mono-calcium phosphate, such as sold by the Victor Chemical Company of Chicago, Illinois, under the trade name V-90. Salts of the other alkaline-earth metals (with the exception of magnesium, which forms water-soluble alginates) may be substituted for the calcium salts. Many of the heavy metals may be substituted for calcium, but not as a rule in edible compositions as most of these metals are more or less toxic.

In producing cold water dessert gels, I have found that dicalcium phosphate and tricalcium phosphate are preferred sources of cations for my purpose.

It will be understood that in the above remarks the reference to calcium salts is intended to be illustrative only. The same principles apply in the use of the corresponding salts of the other alkaline earth metals and of the heavy metals.

The term "a salt whose cations . . . are no more than slightly liberated in water" is intended to cover the type of salt above described, having a low solubility product. The desired effect of restricting the presence of free calcium or similar cations to the lowest possible terms may be realized through low solubility, or low ionizability, or more often through both of these characteristics. It is conceivable, however, that a substance might be completely ionized in water and yet furnish only a negligible number of cations, due to its extremely low solubility. On the other hand, a much more soluble substance might yield the same negligible number of cations by reason of its low inherent ionizability. It is preferred to use a substance for this purpose which has a solubility product not higher than $10^{-4}$ at 25° C. In most cases it will be desirable to use less than the 50% of the stoichiometric equivalent of calcium or other gel-forming salt, although a range of about 25% to 75% of said equivalent amounts of said salt will be found operative.

A further component that is required in my cold water dessert gel compositions is an acid component. This acid component may be fumaric acid, adipic acid, glutaric acid, glucono-d-lactone, or potassium acid tartrate. Fumaric acid is greatly preferred for my purpose and produces a firmer gel. The acid component should be present in an amount of 10% to 100% by weight of the alginate. The acids as purchased are satisfactory for my purpose but better results are obtained if the acid is screened thru 60 on a 100 mesh screen. The coarser acids did not dissolve as fast as is desired while the finer mesh dissolves so rapidly that the alginate does not go into solution in the best manner.

In keeping with my invention, it is my purpose to produce a combination of ingredients that can be added in one step to cold water to produce a dessert gel. Thus, I prefer to premix all of the ingredients, i.e., the carboxymethyl alginate, the salt used as a source of cations, and the acid component. It will be understood, however, that if it should be desired, the ingredients could be added separately to cold water to produce a gel therefrom.

The following formulations were used to make cold water dessert gels from San Diego tap water:

(1)

| | Gms. |
|---|---|
| Sodium carboxymethyl alginate | 5.0 |
| Dicalcium phosphate | 1.0 |
| Fumaric acid (thru 80 on 100 mesh) | 2.0 |
| Dessert grade sugar | 77.0 |

(2)

| | |
|---|---|
| Sodium carboxymethyl alginate | 5.0 |
| Tricalcium phosphate, C.P. grade | 0.7 |
| Fumaric acid (thru 80 on 100 mesh) | 2.0 |
| Dessert grade sugar | 77.0 |

(3)

| | |
|---|---|
| Sodium carboxymethyl alginate | 4.5 |
| Dicalcium phosphate | 1.15 |
| Fumaric acid (thru 60 on 80 mesh) | 2.0 |
| Dessert grade sugar | 77.0 |

(4)

| | |
|---|---|
| Sodium carboxymethyl alginate | 5.0 |
| Dicalcium phosphate | 1.0 |
| Adipic acid | 4.0 |
| Dessert grade sugar | 77.0 |

(5)

| | |
|---|---|
| Sodium carboxymethyl alginate | 5.0 |
| Calcium citrate | 1.1 |
| Fumaric acid (thru 80 on 100 mesh) | 2.0 |
| Dessert grade sugar | 77.0 |

The procedure employed was to dry blend the ingredients thoroughly and add said ingredients to two cups of cold tap water while stirring briskly by hand for approximately one minute. The resultant mixtures were then poured into gel cups and let stand at room temperatures and in a refrigerator. In each instance the gels were ready to eat in thirty minutes to sixty minutes. The gels produced were firm, clear and extremely palatable. The alginate in each case was a low calcium content sodium carboxymethyl alginate having a 3800 cps. viscosity in a 5% solution. This alginate was prepared in accordance with the procedure set forth in column 2, last line through column 3, line 28.

The foregoing is intended to be illustrative of my invention and modifications therein may be made by one skilled in the art.

I claim:

1. A method of producing a cold water dessert gel comprising introducing into the desired quantity of cold water a high viscosity carboxymethyl alginate, a salt selected from the group consisting of dicalcium phosphate, tricalcium phosphate and calcium citrate and an acid component selected from the group consisting of fumaric acid, adipic acid, glutaric acid, glucono-d-lactone and potassium acid tartrate.

2. A new and useful product suitable for producing a dessert gel from cold water comprising a carboxymethyl alginate, a salt selected from the group consisting of dicalcium phosphate, tricalcium phosphate and calcium citrate and an acid selected from the group consisting of fumaric acid, adipic acid, glutaric acid, glucono-d-lactone and potassium acid tartrate.

3. A method of producing a cold water dessert gel comprising admixing the following materials with water in the amounts set forth for each pint of said water so employed:

| | Gms. |
|---|---|
| Sodium carboxymethyl alginate | 5.0 |
| Dicalcium phosphate | 1.0 |
| Fumaric acid | 2.0 |

4. A method of producing a cold water dessert gel comprising admixing the following materials with water in the amounts set forth for each pint of said water so employed:

| | Gms. |
|---|---|
| Sodium carboxymethyl alginate | 5.0 |
| Tricalcium phosphate, C.P. grade | 0.7 |
| Fumaric acid | 2.0 |

5. A method of producing a cold water dessert gel comprising admixing the following materials with water in the amounts set forth for each pint of said water so employed:

| | Gms. |
|---|---|
| Sodium carboxymethyl alginate | 5.0 |
| Dicalcium phosphate | 1.0 |
| Adipic acid | 4.0 |

6. A method of producing a cold water dessert gel comprising admixing the following materials with water in the amounts set forth for each pint of said water so employed:

| | Gms. |
|---|---|
| Sodium carboxymethyl alginate | 5.0 |
| Calcium citrate | 1.1 |
| Fumaric acid | 2.0 |

7. A method of producing a cold water dessert gel comprising introducing into the desired quantity of cold water a high viscosity sodium carboxymethyl alginate, a salt whose cations form a water-insoluble salt with alginic acid and an acid component selected from the group consisting of fumaric acid, adipic acid, glutaric acid, glucono-d-lactone and potassium acid tartrate.

8. A method of producing a dessert gel from cold water which comprises introducing into said water a carboxymethyl alginate, a salt whose cations form a water-insoluble salt with said alginate and fumaric acid.

9. A method of producing a dessert gel from cold water which comprises introducing into said water a carboxymethyl alginate, a salt whose cations form a water-insoluble salt with said alginate and adipic acid.

10. A new and useful product suitable for producing a dessert gel from cold water comprising a carboxymethyl alginate, a salt whose cations form a water-insoluble salt with said alginate and an acid selected from the group consisting of fumaric acid, adipic acid, glutaric acid, glucono-d-lactone and potassium acid tartrate.

11. A new and useful product suitable for producing a dessert gel from cold water comprising a carboxymethyl alginate, a salt whose cations form a water-insoluble salt with said alginate and fumaric acid.

12. A new and useful product suitable for producing a dessert gel from cold water comprising a carboxymethyl alginate, a salt whose cations form a water-insoluble salt with said alginate and adipic acid.

13. As a product suitable for producing a dessert gel from cold water the combination comprising a high viscosity sodium carboxymethyl alginate, a salt whose cations forms a water-insoluble salt with said alginate and fumaric acid.

14. As a product suitable for producing a dessert gel from cold water the combination comprising a high viscosity sodium carboxymethyl alginate, a salt whose cations forms a water-insoluble salt with said alginate and adipic acid.

15. As a product suitable for producing a dessert gel from cold water the combination comprising a high viscosity sodium carboxymethyl alginate, dicalcium phosphate and an acid selected from the group consisting of fumaric acid, adipic acid, glutaric acid, glucono-d-lactone and potassium acid tartrate.

16. As a product suitable for producing a dessert gel from cold water the combination comprising a high viscosity sodium carboxymethyl alginate, dicalcium phosphate and fumaric acid.

17. As a product suitable for producing a dessert gel from cold water the combination comprising a high viscosity sodium carboxymethyl alginate, dicalcium phosphate and adipic acid.

References Cited in the file of this patent

UNITED STATES PATENTS

| 2,412,305 | Stokes et al. | Dec. 10, 1946 |
| 2,441,729 | Steiner | May 18, 1948 |
| 2,671,779 | Gaver et al. | Mar. 9, 1954 |
| 2,698,803 | Common et al. | Jan. 4, 1955 |